US012322567B2

(12) United States Patent
Spencer et al.

(10) Patent No.: US 12,322,567 B2
(45) Date of Patent: Jun. 3, 2025

(54) VACUUM TUBE INSERT ASSEMBLY WITH FEED-THROUGH PIN PLUG AND MATING SOCKET

(71) Applicant: Varex Imaging Corporation, Salt Lake City, UT (US)

(72) Inventors: Gregory Robert Spencer, Magna, UT (US); Jesse Hubbard, South Jordan, UT (US); J. Scott Cox, Midvale, UT (US); Kyle Gray, Midvale, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 367 days.

(21) Appl. No.: 17/853,786

(22) Filed: Jun. 29, 2022

(65) Prior Publication Data

US 2023/0005696 A1 Jan. 5, 2023

Related U.S. Application Data

(60) Provisional application No. 63/217,019, filed on Jun. 30, 2021.

(51) Int. Cl.

| | |
|---|---|
| ***H01J 35/16*** | (2006.01) |
| ***H01J 35/06*** | (2006.01) |
| ***H05G 1/04*** | (2006.01) |

(52) U.S. Cl.

CPC ............ *H01J 35/165* (2013.01); *H01J 35/06* (2013.01); *H05G 1/04* (2013.01); *H01J 2235/06* (2013.01)

(58) Field of Classification Search

CPC ...... H01J 35/165; H01J 35/06; H01J 2235/06; H01J 2235/023; H01J 2235/16; H01J 35/065; H01J 35/16; H01J 35/24; H01J 5/02; H01J 9/18; H01J 9/24; H01J 9/26; H01J 1/18; H01J 19/48; H01J 19/60; H01J 19/66; H01J 29/90; H01J 29/92; H01J 5/22; H01J 5/26; H01J 2237/032;

(Continued)

(56) References Cited

U.S. PATENT DOCUMENTS 4,335,928 A * 6/1982 Barrett .................. H01R 13/53 439/271

5,154,628 A 10/1992 Skegin (Continued)

FOREIGN PATENT DOCUMENTS

CH 212929 A 12/1940

*Primary Examiner* — Irakli Kiknadze

(74) *Attorney, Agent, or Firm* — Dorsey & Whitney LLP

(57) ABSTRACT

A vacuum tube insert assembly includes a flared insert piece having an annular flange and a stem each constructed of glass. The stem extends axially from the flange. The flange surrounds a perimeter edge of a plug concavity defined by the stem. Feed-through pins pass axially through the stem and are sealed thereto. The pins terminate inside of the concavity to form a plug. A socket connects to the plug within the concavity and includes receptacles that removably couple to the pins, with an engagement feature preventing erroneous plug and socket connections. A method includes axially inserting the pins through the stem at a fixed relative position such that the pins are arranged within the plug concavity, sealing the stem such that the stem is vacuum-sealed to the pins, thereby forming the plug, and removably coupling mating receptacles of the socket to the pins.

20 Claims, 9 Drawing Sheets

(58) Field of Classification Search
CPC ......... H01J 2237/166; H01J 2893/0008; H01J 35/153; H01J 35/26; H01J 35/066; H01J 35/14; H01J 2235/10; H01J 21/36; H01J 35/12; H01J 35/32; H01J 35/13; H01J 35/02; H01J 2235/1262; H01J 2235/12; H01J 2235/02; H05G 1/04; H05G 1/025; H05G 1/02; H05G 1/10; B33Y 80/00; A61B 6/00; A61B 6/56; H01R 13/53
USPC ........................................... 378/119, 121, 123
See application file for complete search history.

(56) References Cited

U.S. PATENT DOCUMENTS

| | | | | |
|---|---|---|---|---|
| 5,358,419 | A * | 10/1994 | Pejsa | H01R 13/521 439/272 |
| 6,542,577 | B1 | 4/2003 | Kaczmarek et al. | |
| 9,842,720 | B2 | 12/2017 | Berk et al. | |
| 10,629,402 | B2 | 4/2020 | Huang et al. | |
| 10,631,391 | B2 | 4/2020 | Ueki et al. | |
| 10,825,634 | B2 | 11/2020 | Hansen et al. | |
| 10,978,268 | B1 | 4/2021 | Subraya et al. | |
| 2002/0121854 | A1 | 9/2002 | Ha et al. | |
| 2021/0204385 | A1* | 7/2021 | Chen | H05G 1/04 |

* cited by examiner

VACUUM TUBE INSERT ASSEMBLY WITH FEED-THROUGH PIN PLUG AND MATING SOCKET

CROSS-REFERENCE TO RELATED APPLICATIONS

This application claims priority to, and benefit of, U.S. Provisional Patent Application Ser. No. 63/217,019 filed on Jun. 30, 2021, which is hereby incorporated by reference in its entirety.

BACKGROUND

Vacuum tubes are used in a wide range of applications to control the flow of an electric current between separated electrodes within a sealed vacuum chamber. An x-ray tube is specialized type of vacuum tube commonly used to generate and direct x-ray radiation for various purposes, such as medical imaging, radiology, diagnostics, radiography, tomography, non-destructive testing, materials analysis, security applications, and inspection.

Conventional x-ray tubes operate by emitting a concentrated electron beam using an energized cathode and thereafter directing the emitted electron beam toward an anode-mounted target. The emitted electrons gain energy and accelerate based on the large potential difference across the intervening space between the anode and cathode. Some of the accelerated electrons collide with the target surface on the anode, with a small portion of the incident electron beam energy being converted into useful x-ray radiation. The remaining energy largely takes the form of heat, which is dissipated from the x-ray tube, typically through some type of cooling system.

BRIEF DESCRIPTION OF THE DRAWINGS

The drawings described herein are for illustrative purposes only, are schematic in nature, and are intended to be exemplary rather than to limit the scope of the disclosure.

DETAILED DESCRIPTION

Embodiments of the present disclosure are described herein. The disclosed embodiments are provided as examples and illustration of the various solutions. The drawings are not necessarily to scale, with some features possibly exaggerated or minimized to show particular details of interest. Therefore, specific structural and functional details disclosed herein are not to be interpreted as limiting, but merely as a representative basis for teaching one skilled in the art to variously employ disclosed structure and methodologies.

Numbers provided in flow charts and process descriptions are intended to improve clarity, and do not necessarily indicate a particular order or sequence. For purposes of the present detailed description, words of approximation, such as “about,” “substantially,” “generally,” “approximately,” and the like, may each be used herein in the sense of “at, near, or nearly at,” or “within 0-5% of,” or “within acceptable manufacturing tolerances,” or any logical combination thereof.

Some embodiments described herein relate generally to x-ray tubes and other types of vacuum tubes, glass inserts constructed for use with such vacuum tubes, and methods for making using vacuum tubes and glass inserts as described herein. In particular, the following disclosure relates to extension of substantially-rigid, electrically-conductive feed-through posts or pins into a defined open-ended bowl-like cavity (“concavity”) of a flared insert piece for a glass vacuum tube, with the insert piece ultimately melted and fused with a glass enclosure or envelope. The feed-through pins are arranged to present a plug, to which an operator may removably couple a mating socket. The construction of the socket may vary with the particular temperature and other expected loads applied during testing, loading, and other stages of manufacturing and use.

In contrast with existing approaches in which flexible wires are individually welded to the ends of mating feed-through wires, the rigid feed-through pins contemplated herein, due to their increased rigidity and extension into the volume of the concavity as a predetermined spaced and oriented plug, are less susceptible to breakage, fraying, burning, and electrical short conditions. Additionally, the unique plug-and-socket coupling described below is far less prone to inadvertent wiring errors. Moreover, as the contemplated socket in certain configurations can be installed in only one specified orientation, the plug-and-socket connection reduces errors during manufacturing, installation, and servicing.

Figure 1:
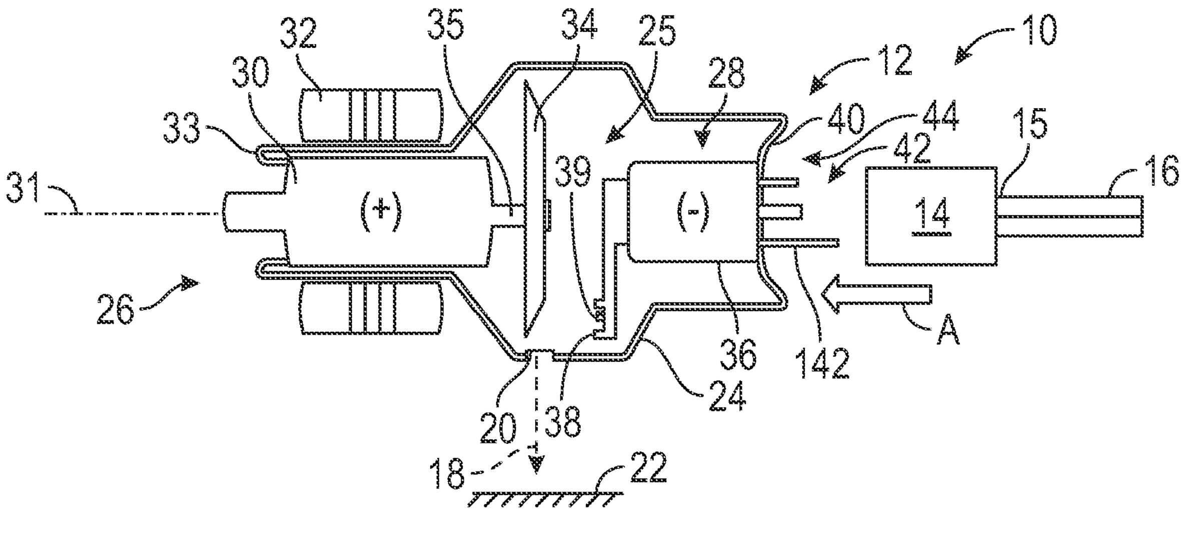
FIG. 1 is an illustration of an exemplary vacuum tube insert assembly for an x-ray tube, with the assembly having feed-through pins forming a plug, and also having a mating socket as set forth herein.

Referring now to the drawings, wherein like reference numbers refer to like components, a vacuum tube insert assembly 10 includes plug means as set forth herein, such as the representative plug 12 shown schematically in FIG. 1. A mating socket means, exemplified as a socket 14, is disposed at a terminal end 15 of a flexible cable 16 is removably coupled to the plug 12, as indicated by arrow A, e.g., to supply electrical power to the vacuum tube insert assembly 10 or to an assembled device using the same. As appreciated in the art, when the vacuum tube insert assembly 10 is used as part of an x-ray tube, the vacuum tube insert assembly 10 may be situated within a lead-lined protective alloy or machined housing (omitted for clarity), or within another suitably protective outer structure, so as to provide stable mechanical support, and thermal insulation.

The exemplary vacuum tube insert assembly 10 depicted in FIG. 1 includes various components that, in a non-limiting x-ray tube embodiment, collectively generate and emit x-ray radiation (arrow 18) through a window 20 toward an object 22, e.g., a patient's chest or appendage. Such components include glass means, such as an enclosure or envelope 24 constructed of glass and defining an internal volume 25, within which is situated a positively-charged anode assembly 26 and a negatively-charged cathode assembly 28, as appreciated in the art. As described herein in the various example embodiments, the envelope 24 may be constructed of borosilicate glass or another hard, application-suitable glass material, and thus is referred to hereinafter as a glass envelope 24, without limiting the materials of construction to glass.

Although simplified in FIG. 1 for the purpose of illustration, the anode assembly 26 includes a cylindrical bearing-mounted rotor 30 having an axis of rotation 31. A stator 32 surrounds a neck 33 of the glass envelope 24, with the stator 32 circumscribing the rotor 30. Thus, when the stator 32 is energized, alternating forces of electromagnetic attraction and repulsion cause the rotor 30 to rotate about the axis of rotation 31, with such rotation in turn causing rotation of an anode target disk 34 constructed, e.g., of tungsten, mounted to the rotor 30, e.g., via an anode stem 35. As appreciated in the art, the target disk 34 provides a material target for interaction with electrons emitted by the cathode assembly 28, with x-rays ultimately generated from such interaction.

The cathode assembly 28 in the simplified embodiment of FIG. 1 includes a cathode head 36 to which is connected a focusing cup 38. The focusing cup 38 in turn contains or is connected to one or more conductive filaments 39, with each filament 39 likewise can be constructed of tungsten or another application-suitable material. When the cathode assembly 28 is energized, an electrical current flows through and heats the filament(s) 39. The heated filament(s) 39 respond by emitting electrons via the process of thermionic emission.

High voltages on the order of one kilovolt (kV) or more are typically applied between the anode assembly 26 and the cathode assembly 28. The glass envelope 24 thus acts as a sealed vacuum enclosure which maintains a high vacuum, typically of less than $10^{-6}$ mmHg. In addition to retaining such a strong vacuum, the glass envelope 24 also electrically isolates the anode assembly 26 from the cathode assembly 28, with potential differences of as high as 150 kV or more maintained therebetween, without significant electric leakage or spurious discharges.

Figure 4:
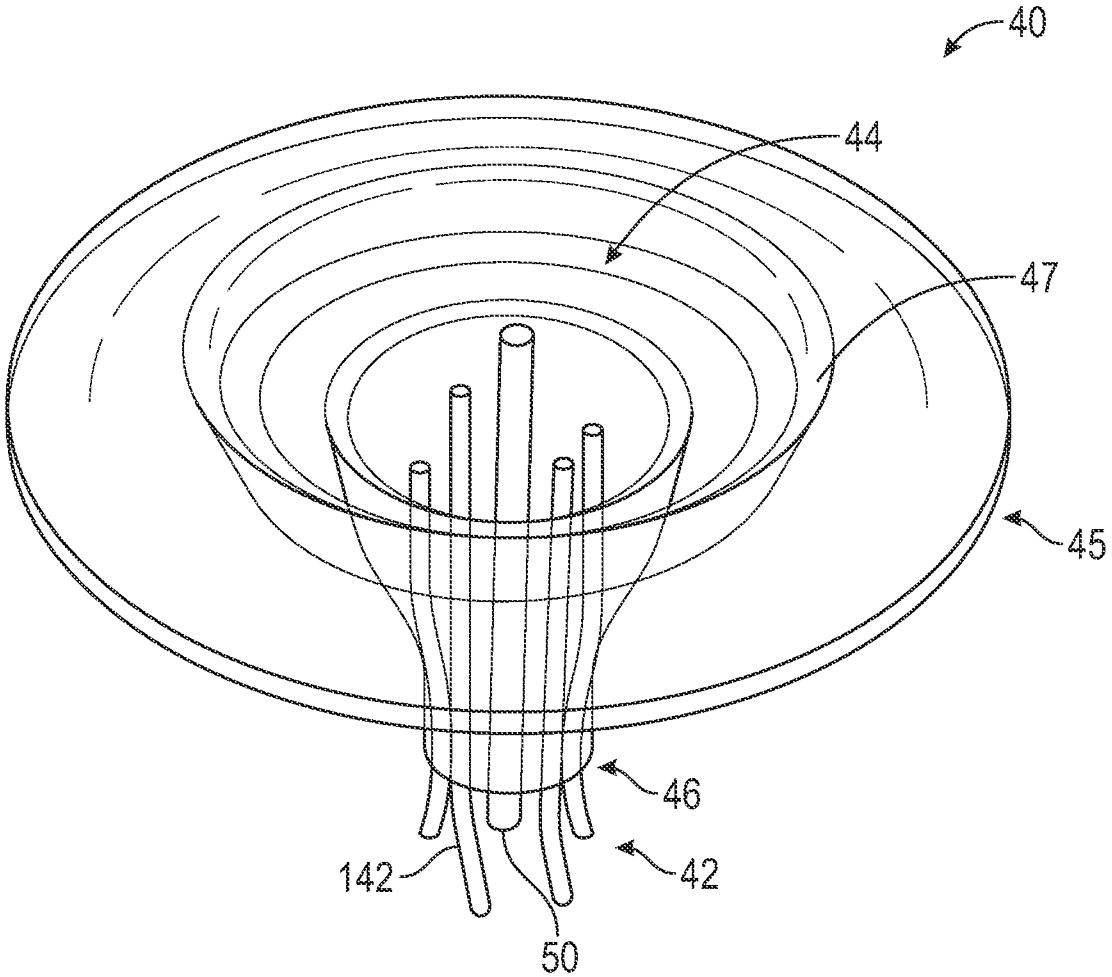
FIGS. 4 and 5 are perspective view illustrations of a representative portion of a flared insert piece constructed as described herein.
Figure 5:
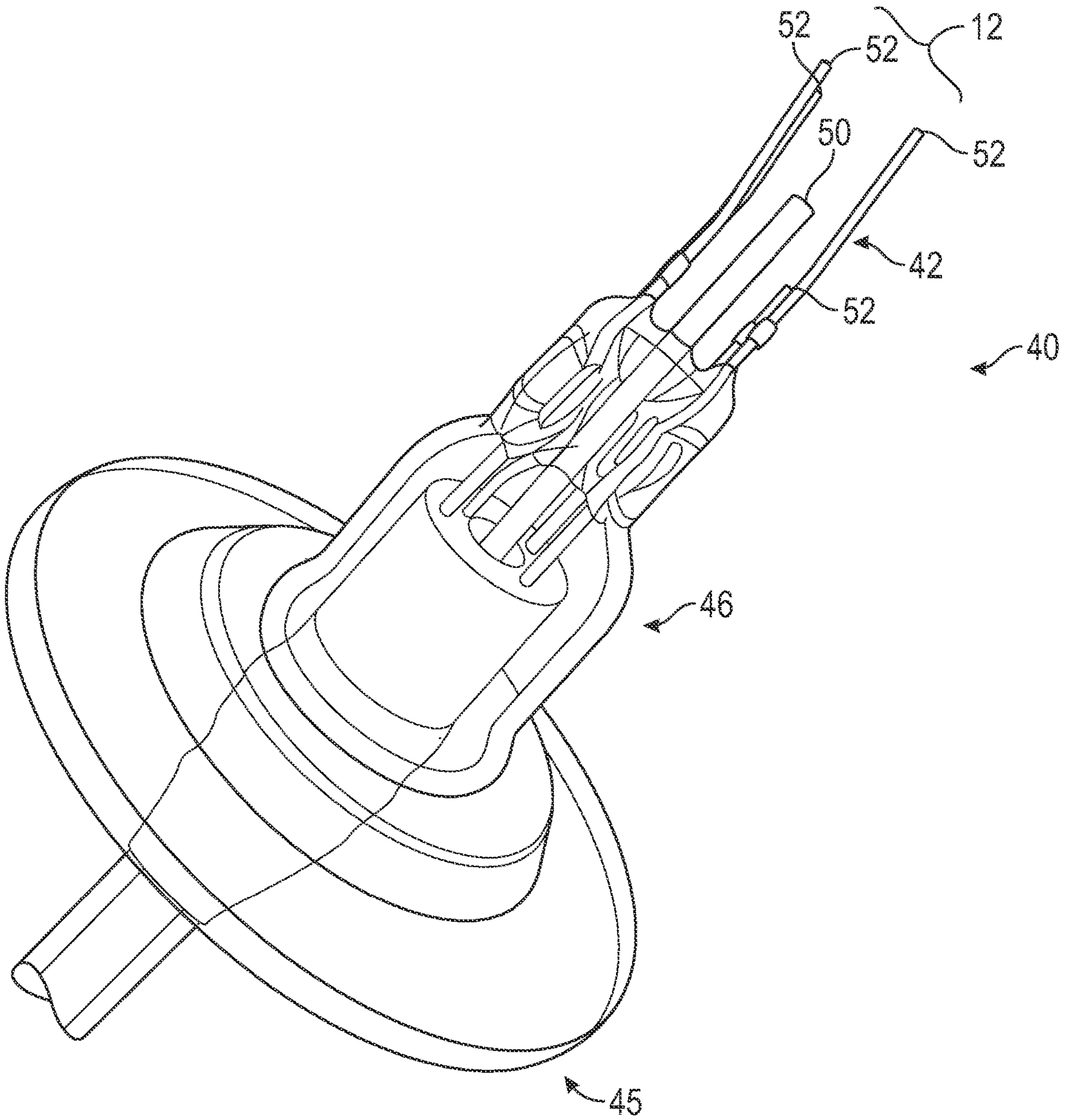

The glass envelope 24 contemplated herein includes a flared insert piece 40, as shown in greater detail in FIGS. 4 and 5, which is disposed proximate the cathode assembly 28. As described in detail below, the flared insert piece 40 is ultimately melted, fused to, and/or integrally formed with, and thus vacuum-sealed, to feed-through pin means, hereinafter exemplified as a plurality of feed-through pins 42, each of which in turn passes axially through the flared insert piece 40. The feed-through pins 42 collectively form the plug 12 within a plug concavity 44 defined by the flared insert piece 40. The plug 12 is thus readily accessible for the purpose of receiving electrical power at various stages of production.

To that end, the socket 14 is removably coupled to the plug 12 within the plug concavity 44, which occurs with a corresponding minimal level of effort. After connecting the various components of the vacuum tube insert assembly 10 depicted in FIGS. 1 and 2, the flared insert piece 40 as described below with reference to FIGS. 3-9 is connected to the glass envelope 24, with the internal volume 25 thereafter evacuated using pumps and other associated equipment.

Figure 2:
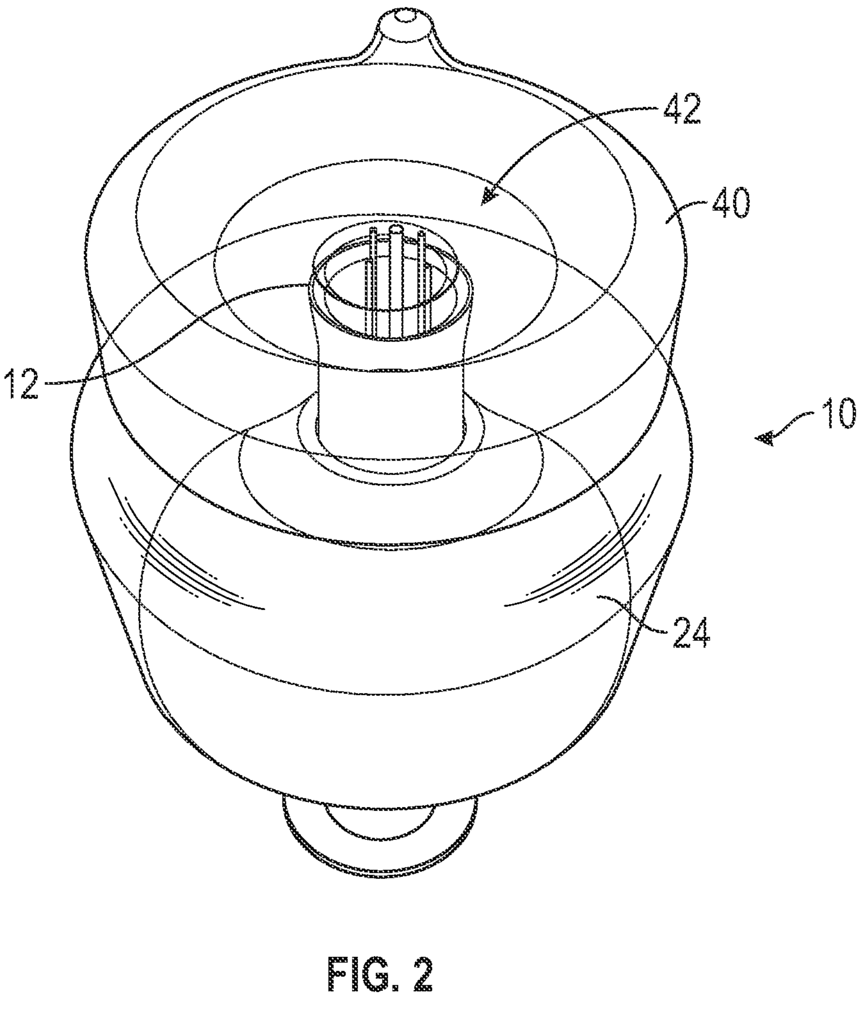
FIG. 2 is a perspective view illustration of an embodiment of the vacuum tube insert assembly shown in FIG. 1.
Figure 3:
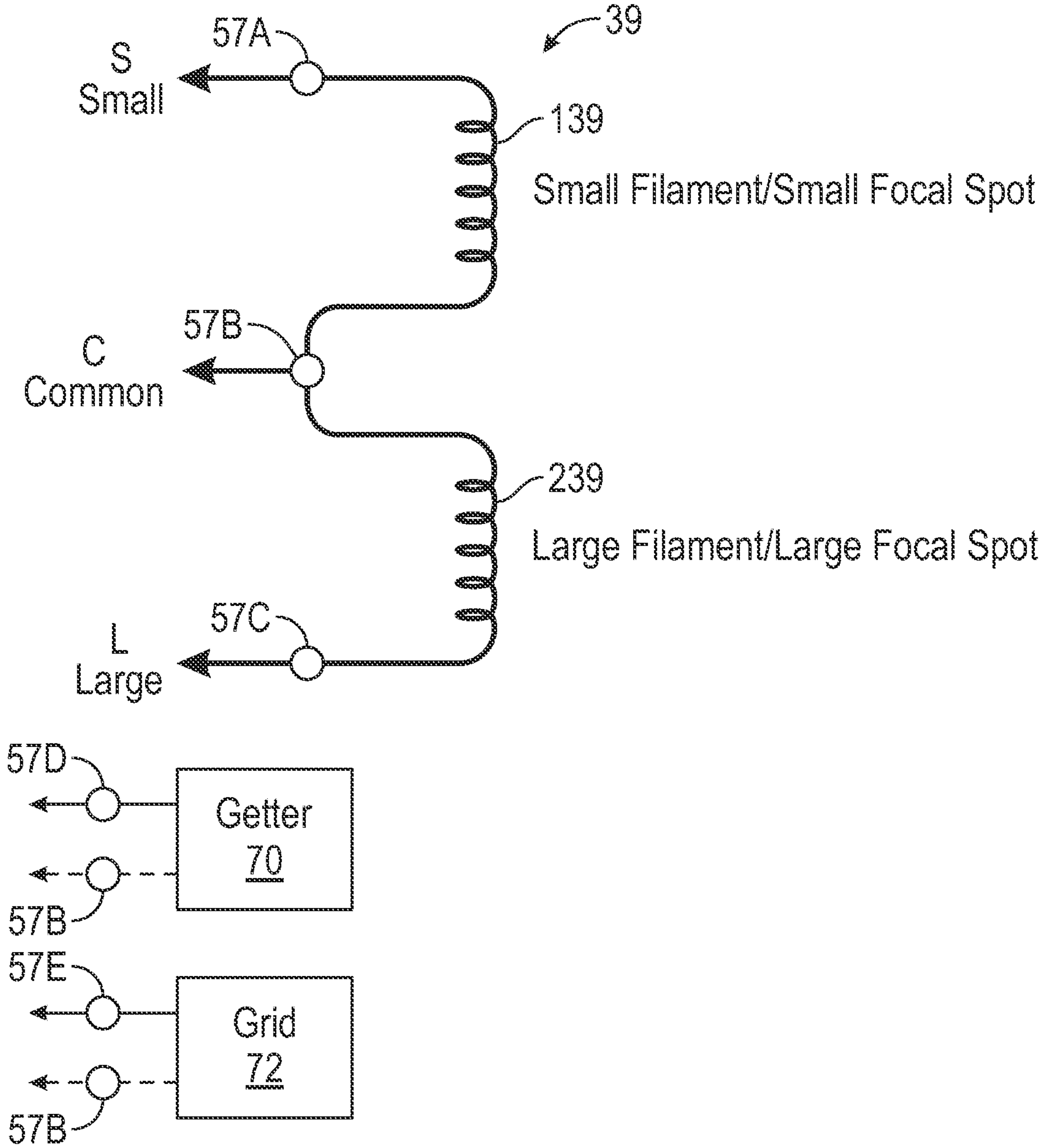
FIG. 3 is a schematic illustration of a representative dual-filament arrangement for use with a cathode assembly depicted in FIG. 1.

Referring briefly to FIG. 3, the number of the feed-through pins 42 (see FIGS. 1 and 2) may vary with the construction of the vacuum tube insert assembly 10. In some embodiments, for instance, the filament(s) 39 may include multiple filaments 39, such as the illustrated dual focus type with filaments 139 and 239. The filaments 139 and 239 are shown with corresponding terminals or nodes, with filament 139 having nodes 57A and 57B, and with filament 239 having nodes 57B and 57C. Also shown are a getter 70 with getter node 57D and a grid 72 with a grid node 57E. Corresponding notations "S Small", "C Common", and "L Large" can be used to connect a single "small" filament (e.g., filament 139 extending between nodes 57A and 57B) or connect a single "large" filament (e.g., filament 239 extending between nodes 57B and 57C). Filaments 139 and 239 may be connected in series by connecting nodes 57A and 57C. Filaments 139 and 239 may be connected in parallel by connecting nodes 57A, 57B, and 57C. As understood in the art, use of a smaller filament results in generation of a smaller focus spot suitable, e.g., for imaging a smaller area. Conversely, use of multiple/larger filaments results in generation of a larger focal spot with a corresponding larger imaging area.

In addition to nodes 57A, 57B, and 57C, the feed-through pins 42 of FIGS. 1 and 2 may also include "getter" and "grid" nodes 57D and 57E, respectively, for a total of five associated feed-through pins 42 in this embodiment. The particular identities of the nodes 57A-R can vary with the application, and thus the illustrated locations in the five-pin embodiment of FIG. 3 are representative of just one possible implementation. As used herein and in the art, a getter absorbs off-gassed particles during manufacturing, and also helps maintain a vacuum after sealing. The getter node 57D thus provides one of the electrical connections to the getter 70. A grid can be used to focus the electrons, or to restrict or even cut off electron flow for fast-switching speeds, i.e., when the x-ray source is turned on and off. The grid node 57E therefore provides one of the electrical connections to the grid 72. It is also possible that some of the illustrated nodes are not used, or are tied together, e.g., the grid node 57, getter node 57E, and common node 57B could be tied together either within the tube or external to the tube. As a result, the cable 16 of FIG. 1 may not be fed with the same number of voltage inputs as the number of feed-through pins 42, e.g., in the example of a 4-pin or 3-pin configuration. For illustrative consistency, however, the vacuum tube insert assembly 10 will be described hereinafter as a representative 5-pin configuration.

Referring now to FIGS. 4 and 5, the flared insert piece 40 includes an annular flange 45, e.g., a substantially flat disk as shown. The annular flange 45 is integrally formed with an axially-extending stem 46. The axially-extending stem 46 in turn defines the plug concavity 44 having a perimeter edge 47, which is also shown but not labeled in FIG. 2. The plug concavity 44 by way of example may have a generally hemispherical or rounded conical shape, such that the plug concavity 44 has a concave bowl-like appearance from the perspective of FIG. 4. The annular flange 45 surrounds the perimeter edge 47 of the plug concavity 44, with an outer diameter and thickness of the annular flange 45 matching that of the remaining structure of the glass envelope 24 to which the insert piece is ultimately fused or connected.

As best shown in FIG. 4, the feed-through pins 42 pass axially through the stem 46 and are melted or fused thereto. The feed-through pins 42 are thus integral with the surrounding glass of the stem 46 once the glass has cooled in order to provide the requisite vacuum seal integrity between a vacuum side within the evacuated internal volume 25 of the glass envelope 24 (see FIG. 1), and the surrounding external/atmospheric pressure side of the vacuum tube insert assembly 10 shown in FIG. 2.

The feed-through pins 42 of FIG. 5 may include a center post 50 flanked by at least two pins 52, with four pins 52 surrounding the center post 50 in the non-limiting exemplary construction of FIG. 5. The center post 50 may have a first radial dimension, e.g., a diameter when the center post 50 is cylindrical, while each of the pins 52 may have a smaller second radial dimension. For instance, the second radial dimension may be less than about 80 percent of the first radial dimension, e.g., about 40 percent to 60 percent of the first dimension or about 25 percent to about 75 percent of the first dimension in different exemplary embodiments. Use of a more robust or thicker construction of the center post 50 facilitates construction of the vacuum tube insert assembly 10 of FIGS. 1 and 2, for instance by providing a substantially rigid center indexing feature to which other components and/or fixtures may be aligned or referenced. While cylindrical feed-through pins are shown, the feed-through pins can have various cross-sections, including but not limited to circular, elliptical, rectangular, or another polygonal or other shape. An engagement feature, which is explained in greater detail below, may be formed when two or more different cross-sectional shapes (or cross-sectional areas) are used for the feed-through pins and corresponding engaging mating receptacles 56 of the socket 14 (FIGS. 7-8) so the plug 12 is received by the socket 14 in a specified and/or unique orientation. Other engagement features may be formed by other variations of features, with examples provided below, so long as the plug 12 is received by the socket 14 in a specified and/or unique orientation.

Proper fusion and adherence of the glass materials of the stem 46 to the feed-through pins 42 may be conducted by various means, one of which is the use of a press and a heat source. As understood in the art and as used herein, such a press may be used to pinch together/concentrate heated glass material of the stem 46 so that the softened viscous glass material flows around and encompasses the feed-through pins 42. When the glass cools, the feed-through pins 42 are integral with the stem 46, with no intervening gaps or spaces present at interfacing surfaces of the feed-through pins 42 and surrounding glass.

To facilitate the requisite vacuum-sealing properties, the materials used for constructing the feed-through pins 42 should be of a similar coefficient of expansion as the glass of the glass envelope 24, such that cracking or spacing does not result upon cooling and solidification of the glass. One possible combination suitable for such a vacuum seal is borosilicate glass or another hard glass for construction of the flared insert piece 40, and plated or non-plated metal such as tungsten (W), molybdenum (Mo), or a nickel cobalt alloy (Ni—Co—Fe) such as Kovar®, any of which are suitable for construction of the feed-through pins 42. That is, the feed-through pins 42 may be constructed of a first metal, which may be optionally plated with a second metal. When plated, suitable electrically-conductive metals may be used to ensure continuity and reduce resistance, with elemental nickel (Ni), gold (Au), copper (Cu), or silver (Ag) being a few possible plating materials. The plating materials may have a high thermal resistance that reduces damage due to thermal stresses.

As best shown in FIG. 4, the feed-through pins 42 terminated position inside of the plug concavity 44 and collectively form the plug 12. The plug 12 is thus presented at a convenient height above the stem 46 for connecting electrical power to the vacuum tube insert assembly 10 of FIGS. 1 and 2 as needed, with the power composition or level possibly differing depending on the particular stage of assembly, test, or loading. For example, the length of the feed-through pins 42 exposed within the volume of the plug concavity 44 may be at least 4 mm to about 10 mm, or another suitable length sufficient for entering and securely engaging mating receptacles 56 of the socket 14 as described herein.

Figure 6:
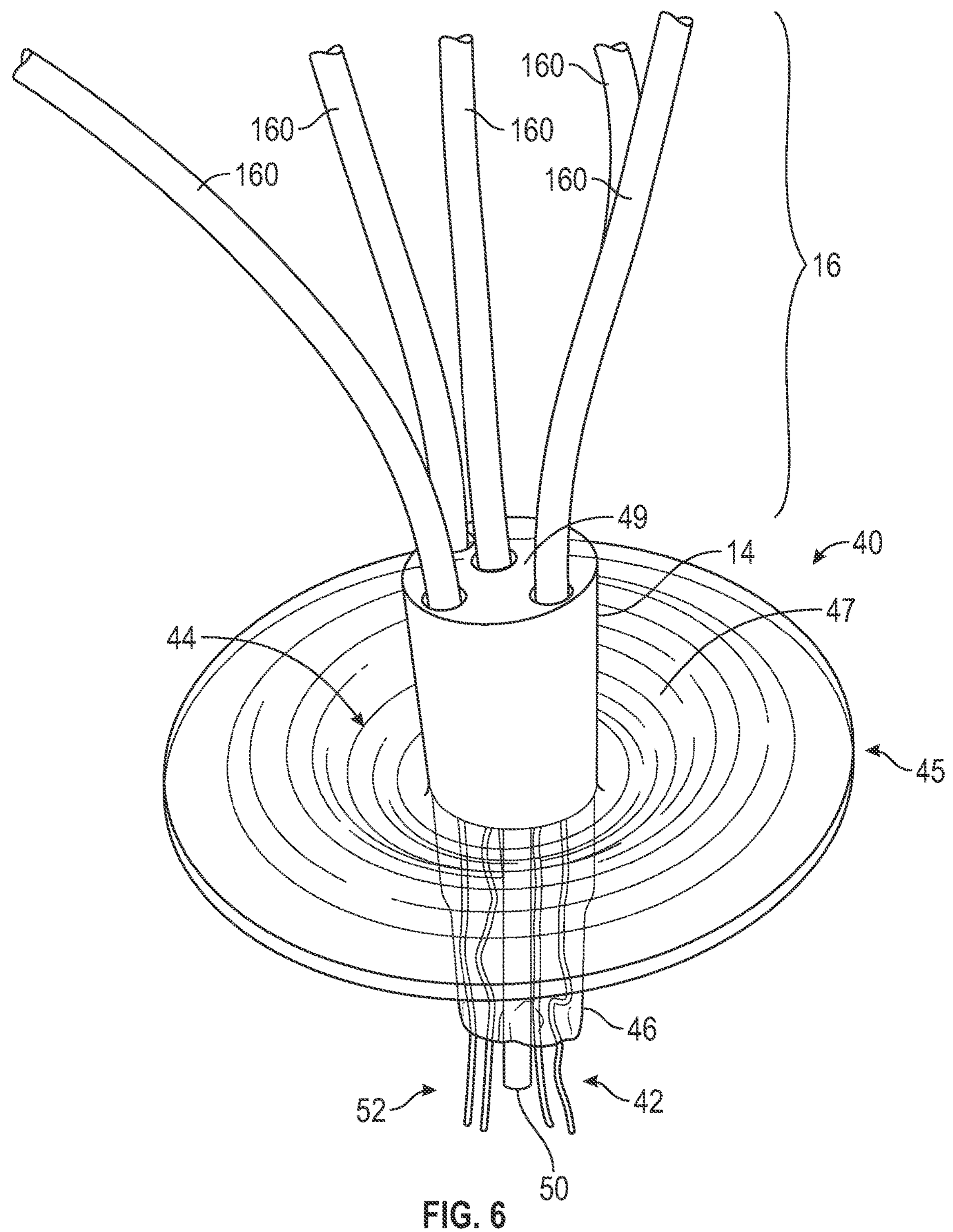
FIGS. 6 and 7 are perspective view illustrations of a socket configured to connect to a plug of the flared insert piece shown in FIGS. 4 and 5.

Referring now to FIG. 6, the flared insert piece 40 is shown as the flared insert piece 40 would appear when viewed from the outside/atmospheric pressure side of the vacuum tube insert assembly 10 of FIGS. 1 and 2. Presentation of a non-flexible/substantially rigid plug 12 (see FIG. 4) within the plug concavity 44 eliminates the need for welding of individual flexible wires to each of the feed-through pins 42, e.g., when installing the cathode assembly 28 of FIG. 1, which can be prone to manufacturing or operator error. Instead, one may simply engage the socket 14 with the exposed feed-through pins 42 of the plug 12 within the plug concavity 44, with the annular flange 45 surrounding the perimeter edge 47 of the plug concavity 44.

Figure 7:
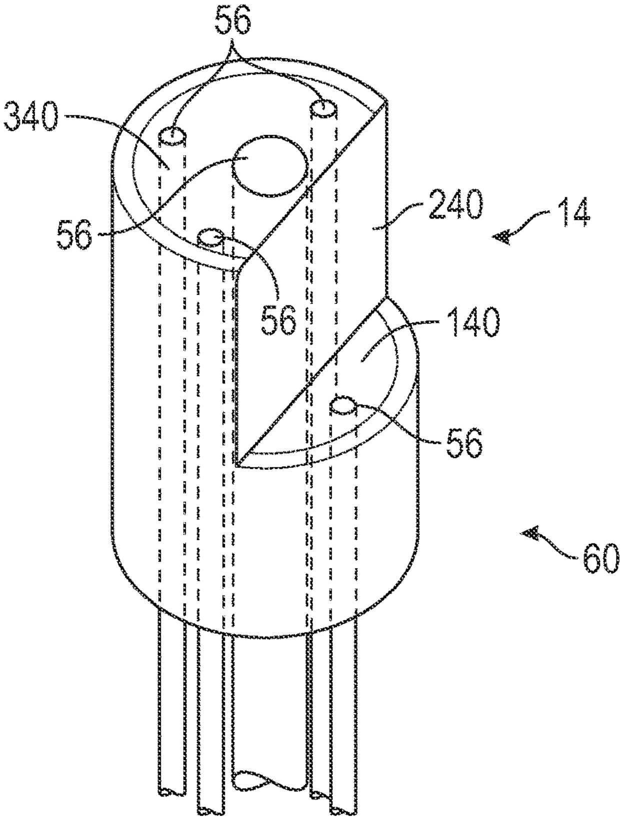

The socket 14 terminates electrical wires 160 forming the cable 16, with individual electrical contacts of the electrical wires 160 contained within the socket 14. Each of the electrical wires 160 shown in FIG. 6 corresponds to one of the above-noted small, large, common, getter, or grid nodes in the representative 5-pin embodiment of FIG. 6. To facilitate assembly, the socket 14 may define respective through-channels 49 for each of the electrical wires 160, which would enable the electrical wires 160 to pass cleanly through the socket 14 to engage a mating receptacle 56 contained therewithin, as shown in FIG. 7. For current limiting, sensing, or other beneficial purposes, any or all of the receptacles 56 may contain a resistor therein or in series therewith.

As contemplated herein, each of the receptacles 56 can be constructed in various alternative forms and with application-suitable internal contact constructions in order to receive and thereafter securely retain a respective one of the fed-through pins 42. That is, a resilient internal electrically-conductive connection or interference fit is provided between the mating feed-through pins 42 and the receptacles 56 to ensure a good electrical connection and continuity between the plug 12 and the socket 14. Alternative types of plug and socket connections may be used within the scope of the disclosure, such as but not limited to male-female plug-socket configurations, hyperboloid contacts, or other suitable embodiments. Although omitted for illustrative simplicity, additional retention mechanisms may be used in other embodiments, such as keyways or similar structure, e.g., requiring a partial rotation of the connected socket 14 after insertion of the plug 12 to securely lock the plug 12 into place.

Materials of construction of the socket 14 may vary depending on the stage of manufacturing. For example, stages requiring exposure of the socket 14 to higher temperatures or power levels could be constructed of a high-temperature resin, while lower temperature or steady-state operating stages may use a lower temperature material such as polycarbonate. Lower temperature materials may be used in part due to the existence of cooling oil and other thermal regulating structure within a fully assembled vacuum tube device, e.g., an x-ray tube, which in turn lowers thermal loading of the socket 14. Three-dimensional (3D) printing or additive manufacturing techniques may be used to construct the socket 14 of FIG. 6 in some implementations in order to form the desired geometry.

Further with respect to the socket 14, errors during installation are reduced by an engagement feature 60 that is configured to permit the plug 12 to receive the socket 14, and vice versa, in a specified orientation of the socket 14. As set forth below, the socket 14 or the plug 12 can separately or together include the engagement feature 60 in different embodiments so as to permit the plug 12 to receive the socket 14 in a specified orientation of the socket 14 and vice versa. To this end, an option for the plug 12 is to form at least one of the feed-through pins 42 with a different height or length relative to the other feed-through pins 42 in order to create a defined height-broken symmetry. For instance, the engagement feature 60 may be implemented by leaving one or more of the feed-through pins 42 longer than remaining feed-through pins 42, with such a feed-through pin 42 being referred to herein as an elongated pin 142 for clarity (see FIGS. 1 and 4). While one such elongated pin 142 is shown for simplicity, more than one feed-through pin 42 may be elongated in other configurations.

As shown in FIG. 7, use of the elongated pin 142 allows the socket 14 to optionally include a radial end surface 340 connected via an axial wall 240 to a stepped-down radial mid-wall surface 140. The radial mid-wall surface 140 may contain at least one of the receptacles 56, with the remaining receptacles 56 contained within and opening from the radial end surface 340 as shown. The receptacle(s) 56 located in the mid-wall surface 140 may be configured to receive the elongated pin 142 (see FIG. 1) in this particular exemplary embodiment, with the identity of the elongated pin 142 relative to connection to the short, long, common, getter, or grid nodes or feeds described above varying with the desired application.

Use of the elongated pin 142 or multiple such elongated pins 142 in this manner ensures that an operator is able to connect the socket 14 to the plug 12 of FIGS. 1, 2, and 4 in a specified orientation. This capability in turn "error-proofs" the installation by reducing the chances of or preventing erroneous connections, e.g., of the type ordinarily established by individual manual connections implemented using alligator clips or direct wire splicing. However, the elongated pin 142 is just one possible implementation of the engagement feature 60.

Figure 8:
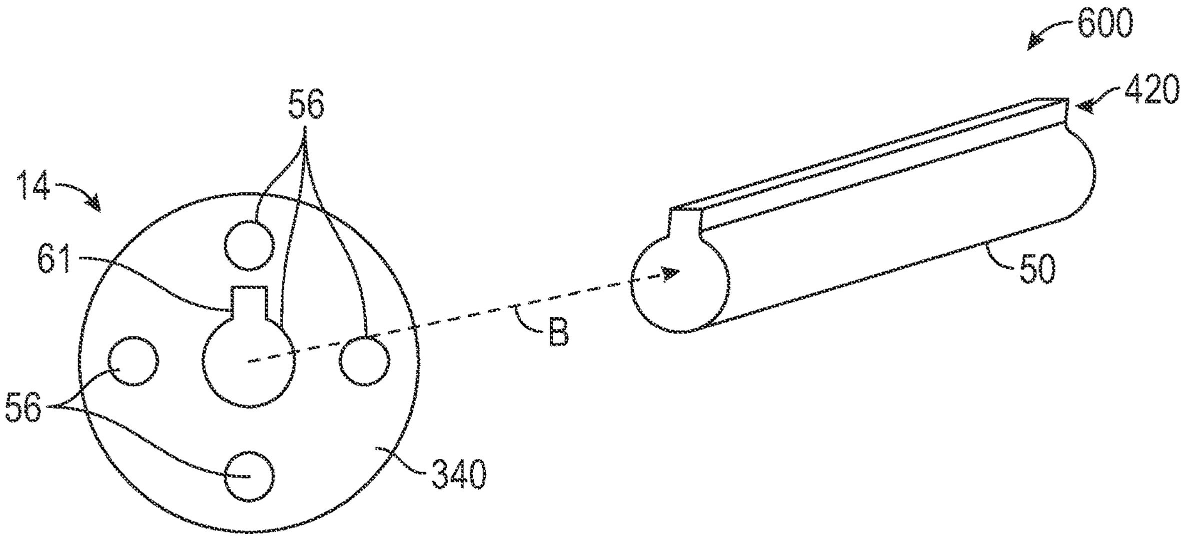
FIG. 8 schematically depicts an alternative engagement feature configuration of the socket shown in FIG. 7.

Referring briefly to the alternative engagement feature 600 of FIG. 8 for example, the plug 12 of FIGS. 1, 2, and 4 may include a keyed or splined surface 420, for instance by forming the same on a surface of the center post 50 or another feed-through pin 42. In such an embodiment, the socket 14 includes a mating keyed or splined surface 61, with a specified orientation of the socket 14 permitting the center post 50 to enter the corresponding receptacle 56. Other possibilities may exist for implementing the engagement feature 60, and therefore the use of the elongated pin 142 and/or the keyed/splined surfaces 420 and 61 are merely exemplary means for permitting the plug 12 to be coupled to the socket 14 in the above-noted specified orientation.

Figure 9:
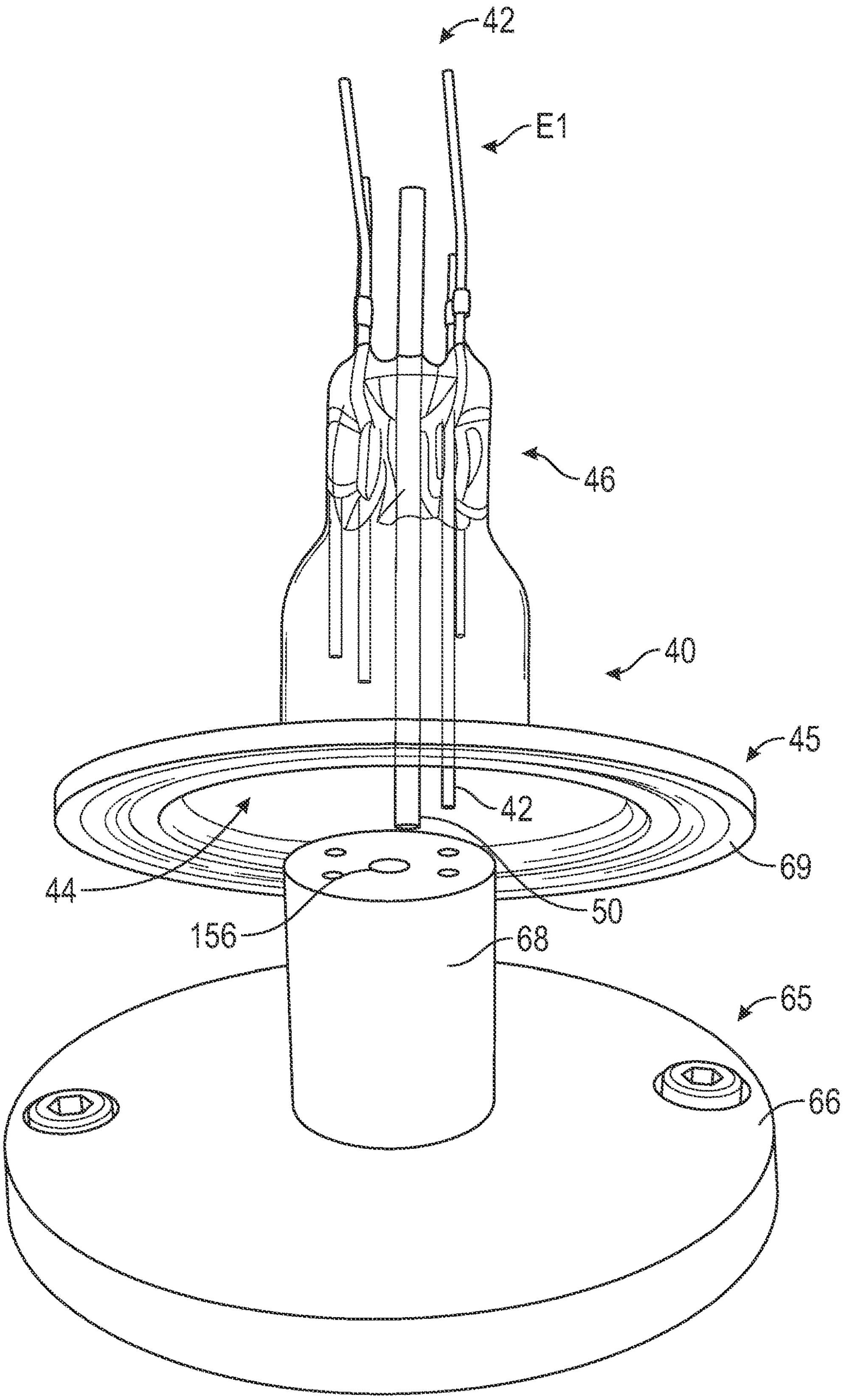
FIGS. 9 and 10 are perspective view illustrations of a pin fixture for use during assembly of the flared insert piece and vacuum tube insert of FIGS. 1 and 2.

Referring to FIG. 9, the center post 50 described above may be used as an indexable feature for the purpose of ensuring proper spacing and leveling of the feed-through pins 42, e.g., prior to melting the stem 46 and sealing the feed-through pins 42 there within. To facilitate installation, for instance, the stem 46 may be leveled using a pin fixture 65 that indexes or aligns the stem 46 in the same orientation every time. As the center post 50 is also used for alignment at later stages of manufacturing, including final seal, the stem 46 should maintain a straight axial alignment. Such alignment is enabled by the representative pin fixture 65, e.g., a solid planar base 66 connected to or integrally formed with an axially-extending fixture post 68.

Figure 10:
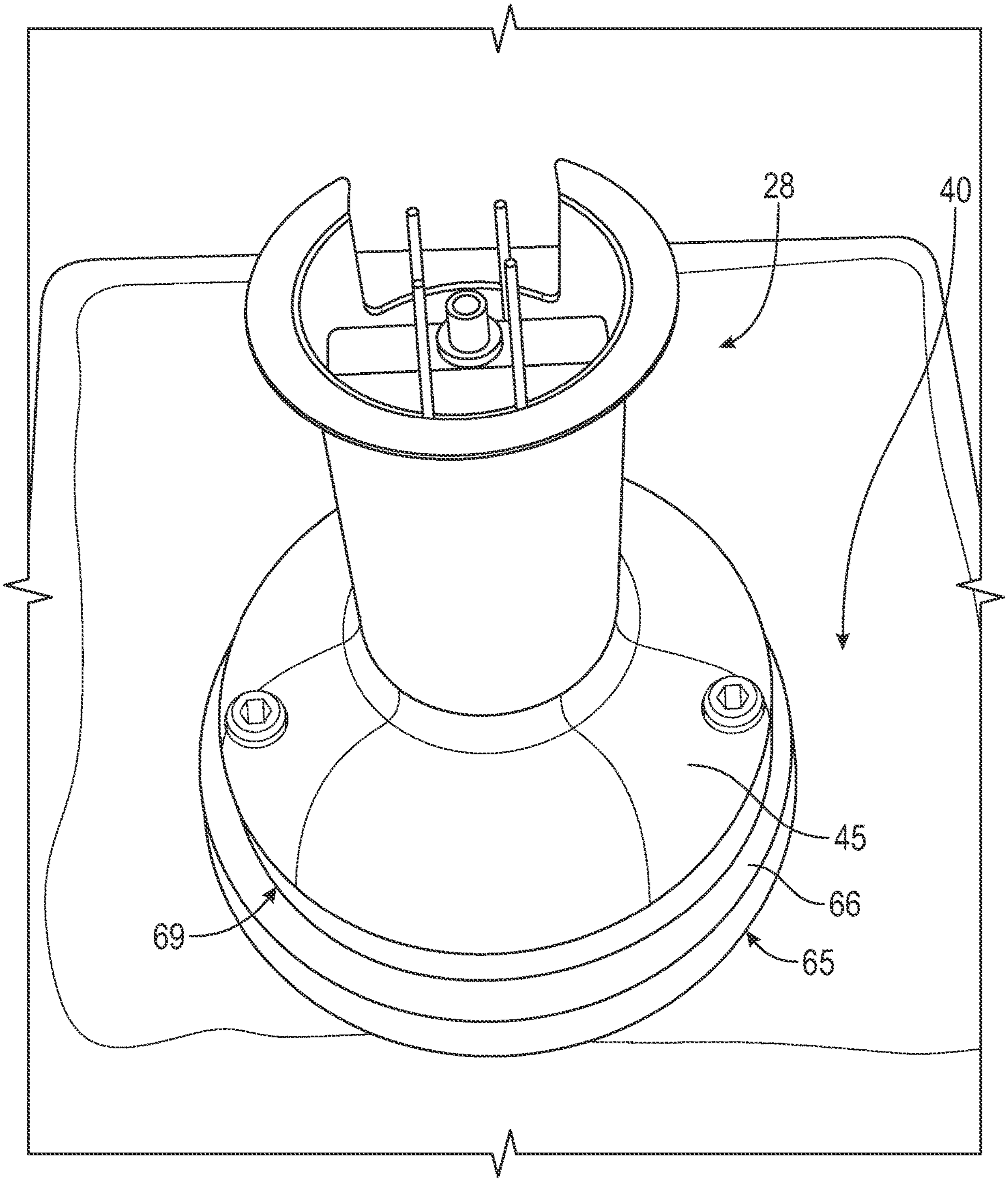

In operation, an operator may axially insert the individual feed-through pins 42 forming the plug 12 through the stem 46 at a fixed position relative to each other, and into mating openings 156 of the pin fixture, in this instance of the fixture post 68, with the fixture post 68 ultimately entering the plug concavity 44. The fixture is designed to hold the feed-through pins 42 in place while the stem 46 is being sealed, so the fixture will have the same number of openings 156 as feed-through pins 42. A radial surface 69 of the annular flange 45 thereafter rests securely on the base 66 as best shown in FIG. 10. The cathode assembly 28 shown in FIG. 10 (also see FIG. 1) is then electrically connected to free ends E1 of the pass-through pins 42 extending from the stem 46 of FIG. 9. This fixturing and leveling approach may be contrasted with conventional approaches in which the stem 46 is leveled off at the radial surface 69 of the glass flare piece 40, which is rarely if ever perfectly flat. As a result, the cathode head 36 (see FIG. 1) can sometimes appear to be slightly crooked, which can create misshapen focal spots.

Figure 11:
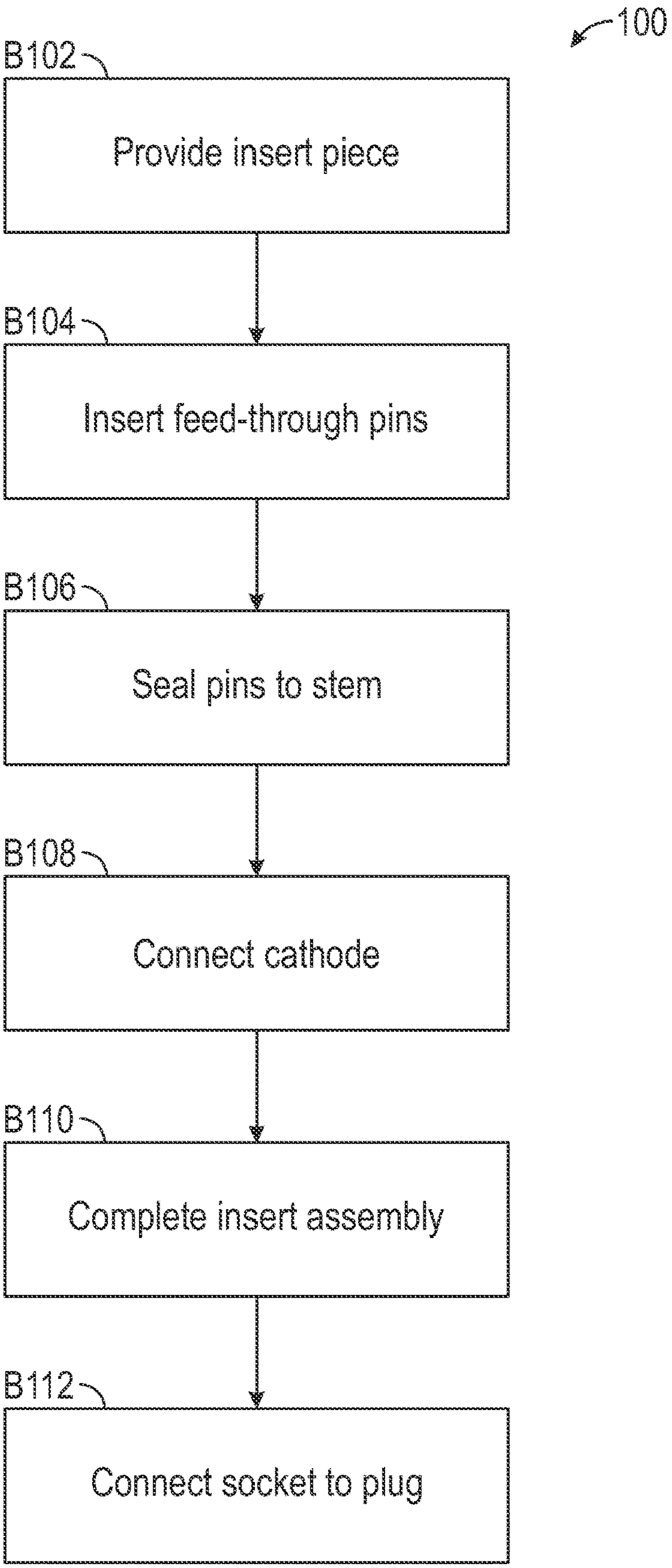
FIG. 11 is a flow chart describing an exemplary method for constructing a vacuum tube insert in accordance with the present disclosure.

FIG. 11 illustrates an exemplary method 100 for constructing the vacuum tube insert assembly 10 for a vacuum tube, e.g., an x-ray tube, as described above with reference to FIGS. 1-10. A possible embodiment of the method 100 commences at block B102, which includes providing a flared insert piece 44 having an annular flange 45 surrounding a plug concavity 44, and a stem 46 integrally formed with the annular flange 45 and extending axially therefrom, as best shown in FIG. 4. The method 100 then proceeds to block B104.

Block B104 entails axially inserting a plurality of feed-through pins 42 through the stem 46 at a fixed position relative to each other, such that the feed-through pins 42 are collectively arranged within the plug concavity 44 as the plug 12. In some implementations of the method 100, this may include inserting the feed-through pins 42 into the openings 156 in the pin fixture 65 (see FIG. 9), with the pin fixture 65 having fixed spacing between the openings 156. Thereafter, the feed-through pins 42 may be pressed through the stem 56, e.g., using a pinch press. Use of the pin fixture 65 therefore has the advantage of maintaining the plane of the annular flange 45 in a perpendicular orientation relative to the center post 50. The method 100 then proceeds to block B106.

Block B106 includes sealing the stem 46 to the feed-through pins 42 such that the stem 46 is vacuum-sealed to the feed-through pins 42, thereby forming the plug 12. Sealing may entail using a glass lathe and/or a press to form the partially molten or viscous heat-softened glass of the stem 46, possibly while the flared insert piece 40 is oriented, leveled, and retained in the pin fixture 65 of FIG. 9 or a similar fixture. The stem 46 is thus vacuum-sealed to the feed-through pins 42, with the feed-through pins 42 extending through the surrounding glass of the stem 46 without any vacuum-compromising intervening space therebetween. The method 100 then proceeds to block B108.

Block B108 of FIG. 11 may include connecting the feed-through pins 42 to corresponding connections of the cathode head 36 and then setting the filament(s) 39 therewithin. As noted above, the feed-through pins 42 are integrally formed with heat-softened glass materials of the stem 46 such that all potentially vacuum-depleting leakage paths are sealed. The method 100 proceeds to block B110 once the cathode assembly 28 has been connected in this manner.

At block B110, the method 100 includes completing construction of the vacuum tube insert assembly 10. This may entail installing the remaining components of FIG. 1, in the non-limiting example construction of an x-ray tube insert. For instance, the anode assembly 26 of FIG. 1 may be screwed directly into the neck 33 and an anode shank (not shown), while the cathode assembly 28 is chucked onto the center post 50. Because the stem 46 was leveled off of the center post 50 using the pin fixture 65, this cathode head 36 is straight during sealing. As part of this effort, the flared insert piece 40 is connected to the glass envelope 24 of FIG. 1 to thereby encapsulate the cathode assembly 28 and the remaining components of FIG. 1 within the defined volume 25 of the glass envelope 24. The glass envelope 24 may be evacuated forming the vacuum. The method 100 thereafter proceeds to block B112.

Block B112 of the method 100 includes removably coupling the mating receptacles 56 of the socket 14, best shown in FIG. 7, to the feed-through pins 42 of the plug 12, itself located within the plug concavity 44 (see FIG. 4). Electrical power is thereby supplied to the vacuum tube insert assembly 10.

As described above with particular reference to FIGS. 7 and 8, block B112 may include orientating the socket 14 to a specified orientation when connecting the socket 14 to the plug 12. Different configurations of the socket 14 may be used for performing the different stages of assembly and testing, including final seal, pumps, bake out, radio frequency (RF), high-voltage testing, and tanks, the latter used for seasoning and removing high electric field areas/asperities such as small burrs.

Similarly, different sockets 14 could be used for sign-off on vitals such as voltage and pressure, and for connecting the vacuum tube insert assembly 10 to external power, with the socket 14 simply plugged directly into the exposed plug 12 to affect the electrical connection. Loading is likewise facilitated, as operators would no longer have to feed individual wires through a small hole in an insulator and individually connect the wires to the cathode assembly 28. Instead, a housing could be modified with a socket 14 that, as explained above, plugs directly onto the feed-through pins 42.

In accordance with an embodiment of the disclosure, a vacuum tube insert assembly 10 includes a flared insert piece 40 having an annular flange 45 and a stem 46 each constructed of glass. The stem extends axially from the annular flange 45 and defines a plug concavity 44. The annular flange 45 surrounds a perimeter edge 47 of the plug concavity 44. Multiple feed-through pins 42 are configured to connect to a component of the vacuum tube insert assembly 10, and pass axially through the stem 46 and are sealed thereto. The feed-through pins 42 terminate at a predetermined distance from the stem 46 inside of the plug concavity 44 to collectively form a plug 12. A socket 14 is configured to connect to the plug 12 within the plug concavity 44, with the socket 14 including a plurality of receptacles 56 collectively configured to removably couple to the feed-through pins 42. The socket 14 or the plug 12 separately or together include an engagement feature 60, 600 configured to permit the plug 12 to receive the socket 14 in a specified orientation of the socket 14.

In an embodiment, the feed-through pins 42 include a center post 50 and one or more remaining feed-through pins 52. The center post 50 has a radial dimension that exceeds a respective radial dimension of the remaining feed-through pins 52. The center post 50 and the feed-through pins 42, 52 may be cylindrical in a possible configuration, with the one or more remaining feed-through pins 52 including four feed-through pins.

In another embodiment, the socket 14 further comprises a flexible cable 16 coupled to the plurality of receptacles 56.

The plug 12 may include the engagement feature 60 configured to permit the plug 12 to receive the socket 14 in a specified orientation. In a possible embodiment, the engagement feature 60 includes at least one of the feed-through pins 42 having an extended length relative to a respective length of one or more remaining feed-through pins 42. The engagement feature 60 may also include a stepped-down radial mid-wall surface 140 containing at least one of the receptacles 56, the at least one of the receptacles 56 being configured to receive therein a respective one of the feed-through pins 42 having the extended length.

The plug 12 and the socket 14 include the engagement feature 600, and the engagement feature 600 in a disclosed embodiment includes a keyed or splined surface 420 of the plug 12. The socket 14 in such an embodiment includes a mating keyed or splined surface 61 configured to receive therein the keyed or splined surface 420 of the plug 12.

The feed-through pins 42 may be optionally constructed of tungsten (W), molybdenum (Mo), or a nickel-cobalt ferrous (Ni—Co—Fe) alloy.

The feed-through pins 42 according to another possible embodiment are constructed of a first metal that is plated with a second metal.

As part of any of the forgoing embodiments, a cathode assembly 28 may be surrounded by a glass envelope 24, with the flared insert piece 40 connected to or formed integrally with the glass envelope 24. The feed-through pins 42 are connected to the cathode assembly 28.

In an embodiment of the disclosure, the vacuum tube insert assembly 10 is configured as an x-ray tube insert assembly 10.

In accordance with another embodiment of the disclosure, a method 100 for constructing a vacuum tube insert assembly 10 includes constructing a flared insert piece 40 and a stem 46 from glass, the flared insert piece 40 having an annular flange 45 surrounding a plug concavity 44, and the stem 46 integrally formed with the annular flange 45 and extending axially therefrom. The method 100 in this embodiment includes axially inserting a plurality of feed-through pins 42 through the stem 46 at a fixed position relative to each other, such that the feed-through pins 42 are collectively arranged as a plug 12 within the plug concavity 44, and such that at least one of the feed-through pins 142 is longer than a remaining quantity of the feed-through pins 42. The method 100 also includes sealing the stem 46 to the feed-through pins 42, thereby forming the plug 12. The method 100 may also include removably coupling mating receptacles 56 of a socket 14 to the feed-through pins 42 of the plug 12 of the vacuum tube insert assembly 10.

In accordance with another embodiment of the disclosure, a method 100 for constructing a vacuum tube insert assembly 10 includes constructing a flared insert piece 40 and a stem 46 from glass, the flared insert piece 40 having an annular flange 45 surrounding a plug concavity 44, and the stem 46 integrally formed with the annular flange 45 and extending axially therefrom. The method 100 in this embodiment includes axially inserting a plurality of feed-through pins 42 through the stem 46 at a fixed position relative to each other, such that the feed-through pins 42 are collectively arranged as a plug 12 within the plug concavity 44. The method 100 also includes sealing the stem 46 to the feed-through pins 42, thereby forming the plug 12. The socket 14 or the plug 12 separately or together include an engagement feature 60, 600 configured to permit the plug 12 to receive the socket 14 in a specified orientation of the socket 14. The method 100 may also include removably coupling mating receptacles 56 of a socket 14 to the feed-through pins 42 of the plug 12 of the vacuum tube insert assembly 10.

Axially inserting the plurality of feed-through pins 42 through the stem 46 at a fixed position relative to each other may include inserting the feed-through pins 42 into a plurality of openings 156 in a pin fixture 65, the pin fixture 65 having fixed spacing between the openings 156, and pressing the feed-through pins 42 through the stem 46.

In a possible embodiment, the method 100 includes connecting the feed-through pins 42 to corresponding connections of a cathode assembly 28, and connecting the flared insert piece 40 to a glass envelope 24 to thereby encapsulate the cathode assembly 28 within a volume 25 of the glass envelope 24.

In an embodiment, the method 100 includes positioning the socket 14 in the specified orientation via the engagement feature 60, 600 before connecting the socket 14 to the plug 12. The engagement feature 60, 600 includes the at least one of the feed-through pins 142 being longer than a remaining quantity of the feed-through pins 42.

Removably coupling the mating receptacles 56 of the socket 14 to the feed-through pins 42 of the plug 12 within the plug concavity 44 includes, in a possible embodiment, inserting an elongated feed-through pin 42 into one of the mating receptacles 56 located in a stepped-down radial mid-wall surface 140 of the socket 14.

Removably coupling the mating receptacles 56 of the socket 14 to the feed-through pins 42 of the plug 12 within the plug concavity 44 may include inserting a keyed or splined surface 420 of one or more of the feed-through pins 42 into a matching keyed or splined surface 61 of one of the mating receptacles 56.

Some embodiments of the disclosed vacuum tube insert assembly 10 comprise annular flange means and stem means. For instance, a vacuum tube insert assembly can include a glass means, including an annular flange means integrally formed with an axially-extending stem means, the stem means defining a plug concavity means. The annular flange means surrounds a perimeter edge of the plug concavity means. The plug means includes a plurality of feed-through pin means passing axially through and sealed to the glass means, and terminating inside of the plug concavity means. The socket means for its part can be configured to connect to the plug means within the plug concavity means. A plurality of receptacle means of the socket means is configured to removably couple to the feed-through pin means of the plug means. The socket means or the plug means separately or together include an engagement feature means configured to permit the plug means to receive the socket means in a specified orientation of the socket means and vice versa.

The engagement feature means can optionally include a keyed or splined surface of the plug means, and a mating keyed or splined surface of the socket means configured to receive therein the keyed or splined surface of the plug means.

Examples of the annular flange means include the annular flange 42. Examples of the stem means include an axially-extending stem 46 integrally formed with the glass envelope 24, the stem 46 defining a plug concavity means. Additionally, examples of plug concavity means include the plug concavity 44 described above, with the annular flange means surrounding a perimeter edge of the plug concavity means. Examples of the plug means include the plug 12 described above, including a plurality of feed-through pin means, examples of which include the above-described feed-through pins 42 passing axially through and sealed to the glass means, and terminating inside of the plug concavity means. A socket means in this embodiment of the disclosure, exemplified as the socket 14, is configured to connect to the plug means within the plug concavity means. A plurality of receptacle means of the socket means is configured to removably couple to the feed-through pin means of the plug means, with examples of the receptacle means being the above-described receptacles 56.

The plug means in some embodiments includes an engagement feature means configured to permit the plug means to receive the socket means in a specified orientation, with examples of the engagement feature means including the engagement feature 60, 600 described above.

The following Clauses provide representative configurations of vacuum tube insert assemblies and method for assembling the same as disclosed herein.

Clause 1: A vacuum tube insert assembly, comprising: a flared insert piece having an annular flange and a stem each constructed of glass, the stem extending axially from the annular flange and defining a plug concavity, wherein the annular flange surrounds a perimeter edge of the plug concavity; multiple feed-through pins configured to connect to a component of the vacuum tube insert assembly, and passing axially through the stem and sealed thereto, wherein the feed-through pins terminate at a predetermined distance from the stem inside of the plug concavity to collectively form a plug; and a socket configured to connect to the plug within the plug concavity, the socket including a plurality of receptacles collectively configured to removably couple to the feed-through pins, wherein the socket or the plug separately or together include an engagement feature configured to permit the plug to receive the socket in a specified orientation of the socket.

Clause 2: The vacuum tube insert assembly of clause 1, wherein the feed-through pins include a center post and one or more remaining feed-through pins, the center post having a radial dimension that exceeds a respective radial dimension of the remaining feed-through pins.

Clause 3: The vacuum tube insert assembly of clause 2, wherein the center post and the pins are cylindrical, and wherein the one or more remaining feed-through pins includes four feed-through pins.

Clause 4: The vacuum tube insert assembly of any one of clauses 1-3, wherein the socket further comprises a flexible cable coupled to the plurality of receptacles.

Clause 5: The vacuum tube insert assembly of any one of clauses 1-4, wherein the plug includes the engagement feature.

Clause 6: The vacuum tube insert assembly of clause 5, wherein the engagement feature includes at least one of the feed-through pins having an extended length relative to a respective length of one or more remaining feed-through pins.

Clause 7: The vacuum tube insert assembly of clause 6, wherein the engagement feature includes a stepped-down radial mid-wall surface containing at least one of the receptacles, the at least one of the receptacles being configured to receive therein a respective one of the feed-through pins having the extended length.

Clause 8: The vacuum tube insert assembly of clause 5, wherein the plug and the socket include the engagement feature, the engagement feature includes a keyed or splined surface of the plug, and the socket includes a mating keyed or splined surface configured to receive therein the keyed or splined surface of the plug.

Clause 9: The vacuum tube insert assembly of any one of clauses 1-8, wherein the feed-through pins are constructed of tungsten (W), molybdenum (Mo), or a nickel-cobalt ferrous (Ni—Co—Fe) alloy.

Clause 10: The vacuum tube insert assembly of any one of clauses 1-9, wherein the feed-through pins are constructed of a first metal that is plated with a second metal.

Clause 11: The vacuum tube insert assembly of any one of clauses 1-10, further comprising: a cathode assembly surrounded by a glass envelope, wherein the flared insert piece is connected to or formed integrally with the glass envelope, and wherein the feed-through pins are connected to the cathode assembly.

Clause 12: The vacuum tube insert assembly of clause 11, wherein the vacuum tube insert assembly is configured as an x-ray tube insert assembly.

Clause 13: A method for constructing a vacuum tube insert assembly, comprising: constructing a flared insert piece and a stem from glass, the flared insert piece having an annular flange surrounding a plug concavity, and the stem being integrally formed with the annular flange and extending axially therefrom; axially inserting a plurality of feed-through pins through the stem at a fixed position relative to each other, such that the feed-through pins are collectively arranged as a plug within the plug concavity; and sealing the stem to the feed-through pins, thereby forming the plug, wherein the plug or a mating socket includes an engagement feature permitting the plug to receive the socket in a specified orientation.

Clause 14: The method of clause 13, wherein axially inserting the plurality of feed-through pins through the stem at a fixed position relative to each other further comprises: inserting the feed-through pins into a plurality of openings in a pin fixture, the pin fixture having fixed spacing between the openings; and pressing the feed-through pins through the stem.

Clause 15: The method of either of clauses 13 or 14, further comprising: removably coupling mating receptacles of the socket to the feed-through pins of the plug of the vacuum tube insert assembly.

Clause 16: The method of clause 15, further comprising: positioning the socket in the specified orientation via the engagement feature before connecting the socket to the plug, wherein the engagement feature includes the at least one of the feed-through pins being an elongated feed-through pin that is longer than the remaining quantity of the feed-through pins.

Clause 17: The method of clause 15, wherein removably coupling the mating receptacles of the socket to the feed-through pins of the plug within the plug concavity includes inserting an elongated feed-through pin into one of the mating receptacles located in a stepped-down radial mid-wall surface of the socket.

Clause 18: The method of any one of clauses 15-17, wherein removably coupling the mating receptacles of the socket to the feed-through pins of the plug within the plug concavity includes inserting a keyed or splined surface of one or more of the feed-through pins into a matching keyed or splined surface of one of the mating receptacles.

Clause 19: A vacuum tube insert assembly, comprising: a glass means, including an annular flange means integrally formed with an axially-extending stem means, the stem means defining a plug concavity means, wherein the annular flange means surrounds a perimeter edge of the plug concavity means; a plug means including a plurality of feed-through pin means passing axially through and sealed to the glass means, and terminating inside of the plug concavity means; and a socket means configured to connect to the plug means within the plug concavity means, wherein a plurality of receptacle means of the socket means is configured to removably couple to the feed-through pin means of the plug means, wherein the socket means or the plug means separately or together include an engagement feature means configured to permit the plug means to receive the socket means in a specified orientation of the socket means.

Clause 20: The vacuum tube insert assembly of clause 19, wherein the engagement feature means includes a keyed or splined surface of the plug means, and a mating keyed or splined surface of the socket means configured to receive therein the keyed or splined surface of the plug means.

While these systems and methods have been described with reference to exemplary embodiments, it will be understood by those skilled in the art that various changes may be made and equivalents can be substituted to adapt these teachings to other problems, materials, and technologies, without departing from the scope of the claims. Features, aspects, components or acts of one embodiment may be combined with features, aspects, components, or acts of other embodiments described herein. The invention is thus not limited to the particular examples that are disclosed, but encompasses all embodiments falling within the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for a first claim set that begins with independent claim 1, claim 3 can depend from either of claims 1 and 2, with these separate dependencies yielding two distinct embodiments; claim 4 can depend from any one of claim 1, 2, or 3, with these separate dependencies yielding three distinct embodiments; claim 5 can depend from any one of claim 1, 2, 3, or 4, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. A vacuum tube insert assembly, comprising:

a flared insert piece having an annular flange and a stem each constructed of glass, the stem extending axially from the annular flange and defining a plug concavity, wherein the annular flange surrounds a perimeter edge of the plug concavity;

multiple feed-through pins configured to connect to a component of the vacuum tube insert assembly, and passing axially through the stem and sealed thereto, wherein the feed-through pins comprise a continuous material extending a first distance from an inner surface of the stem into an internal volume of the vacuum tube insert assembly and terminate at a second distance from an outer surface of the stem inside of the plug concavity to collectively form a plug; and a socket configured to connect to the plug within the plug concavity, the socket including a plurality of receptacles collectively configured to removably couple to the feed-through pins, wherein the socket or the plug separately or together include an engagement feature configured to permit the plug to receive the socket in a specified orientation of the socket.

2. The vacuum tube insert assembly of claim 1, wherein the feed-through pins include a center post and one or more remaining feed-through pins, the center post having a radial dimension that exceeds a respective radial dimension of the remaining feed-through pins.

3. The vacuum tube insert assembly of claim 2, wherein the center post and the pins are cylindrical, and wherein the one or more remaining feed-through pins includes four feed-through pins.

4. The vacuum tube insert assembly of claim 1, wherein the socket further comprises a flexible cable coupled to the plurality of receptacles.

5. The vacuum tube insert assembly of claim 1, wherein the plug includes the engagement feature.

6. The vacuum tube insert assembly of claim 5, wherein the engagement feature includes at least one of the feed-through pins having an extended length relative to a respective length of one or more remaining feed-through pins.

7. The vacuum tube insert assembly of claim 6, wherein the engagement feature includes a stepped-down radial mid-wall surface containing at least one of the receptacles, the at least one of the receptacles being configured to receive therein a respective one of the feed-through pins having the extended length.

8. The vacuum tube insert assembly of claim 5, wherein the plug and the socket include the engagement feature, the engagement feature includes a keyed or splined surface of the plug, and the socket includes a mating keyed or splined surface configured to receive therein the keyed or splined surface of the plug.

9. The vacuum tube insert assembly of claim 1, wherein the feed-through pins are constructed of tungsten (W), molybdenum (Mo), or a nickel-cobalt ferrous (Ni—Co—Fe) alloy.

10. The vacuum tube insert assembly of claim 1, wherein the feed-through pins are constructed of a first metal that is plated with a second metal.

11. The vacuum tube insert assembly of claim 1, further comprising:

a cathode assembly surrounded by a glass envelope, wherein the flared insert piece is connected to or formed integrally with the glass envelope, and wherein the feed-through pins are connected to the cathode assembly.

12. The vacuum tube insert assembly of claim 11, wherein the vacuum tube insert is configured as an x-ray tube insert.

13. A method for constructing a vacuum tube insert assembly, comprising:

constructing a flared insert piece and a stem from glass, the flared insert piece having an annular flange surrounding a plug concavity, and the stem being integrally formed with the annular flange and extending axially therefrom;

axially inserting a plurality of feed-through pins through the stem at a fixed position relative to each other, such that the feed-through pins are collectively arranged as a plug within the plug concavity with the feed-through pins comprising a continuous material extending a first distance from an inner surface of the stem into an internal volume of the vacuum tube insert assembly and extending to terminate at a second distance from an outer surface of the stem inside the plug concavity; and sealing the stem to the feed-through pins, thereby forming the plug, wherein the plug or a mating socket includes an engagement feature permitting the plug to receive the socket in a specified orientation.

14. The method of claim 13, wherein axially inserting the plurality of feed-through pins through the stem at a fixed position relative to each other further comprises:

inserting the feed-through pins into a plurality of openings in a pin fixture, the pin fixture having fixed spacing between the openings; and pressing the feed-through pins through the stem.

15. The method of claim 13, further comprising:

removably coupling mating receptacles of the socket to the feed-through pins of the plug of the vacuum tube insert assembly.

16. The method of claim 15, further comprising:

positioning the socket in the specified orientation via the engagement feature before connecting the socket to the plug, wherein the engagement feature includes the at least one of the feed-through pins being an elongated feed-through pin that is longer than the remaining quantity of the feed-through pins.

17. The method of claim 15, wherein removably coupling the mating receptacles of the socket to the feed-through pins of the plug within the plug concavity includes inserting an elongated feed-through pin into one of the mating receptacles located in a stepped-down radial mid-wall surface of the socket.

18. The method of claim 15, wherein removably coupling the mating receptacles of the socket to the feed-through pins of the plug within the plug concavity includes inserting a keyed or splined surface of one or more of the feed-through pins into a matching keyed or splined surface of one of the mating receptacles.

19. A vacuum tube insert assembly, comprising:

a glass enclosure, including an annular flange integrally formed with an axially-extending stem, the stem defining a plug concavity, wherein the annular flange surrounds a perimeter edge of the plug concavity;

a plug including a plurality of feed-through pins passing axially through and sealed to the glass enclosure, the feed-through pins comprising a continuous material extending a first distance from an inner surface of the stem into an internal volume of the glass enclosure and extending a second distance from an outer surface of the stem to terminate inside of the plug concavity; and a socket configured to connect to the plug within the plug concavity, wherein a plurality of receptacles of the socket is configured to removably couple to the feed-through pins of the plug, wherein the socket or the plug separately or together include an engagement feature configured to permit the plug to receive the socket in a specified orientation of the socket.

20. The vacuum tube insert assembly of claim 19, wherein the engagement feature includes a keyed or splined surface of the plug, and a mating keyed or splined surface of the socket configured to receive therein the keyed or splined surface of the plug.

* * * * *